United States Patent
Lee et al.

(10) Patent No.: US 9,631,509 B1
(45) Date of Patent: Apr. 25, 2017

(54) RIM SEAL ARRANGEMENT HAVING PUMPING FEATURE

(71) Applicant: Siemens Energy, Inc., Orlando, FL (US)

(72) Inventors: Ching-Pang Lee, Cincinnati, OH (US); Caleb Myers, Cincinnati, OH (US)

(73) Assignee: Siemens Energy, Inc., Orlando, FL (US)

( * ) Notice: Subject to any disclaimer, the term of this patent is extended or adjusted under 35 U.S.C. 154(b) by 0 days.

(21) Appl. No.: 14/946,893

(22) Filed: Nov. 20, 2015

(51) Int. Cl.
| | | |
|---|---|---|
| *F01D 11/04* | (2006.01) | |
| *F16J 15/44* | (2006.01) | |
| *F01D 5/18* | (2006.01) | |
| *F01D 9/04* | (2006.01) | |
| *F01D 5/08* | (2006.01) | |

(52) U.S. Cl.
CPC ............ *F01D 11/04* (2013.01); *F01D 5/081* (2013.01); *F01D 5/187* (2013.01); *F01D 9/04* (2013.01); *F16J 15/44* (2013.01); *F05D 2220/32* (2013.01); *F05D 2260/2212* (2013.01)

(58) Field of Classification Search
CPC .......... F01D 11/04; F01D 5/187; F01D 5/081; F01D 9/04; F16J 15/44; F05D 2260/2212; F05D 2220/32
See application file for complete search history.

(56) References Cited

U.S. PATENT DOCUMENTS

| | | | | |
|---|---|---|---|---|
| 4,348,157 A | * | 9/1982 | Campbell | F01D 5/081 415/115 |
| 7,189,055 B2 | * | 3/2007 | Marini | F01D 5/081 415/115 |
| 8,939,711 B2 | * | 1/2015 | Lee | F01D 11/001 415/116 |
| 9,017,014 B2 | * | 4/2015 | Lee | F01D 5/082 415/115 |
| 9,039,357 B2 | * | 5/2015 | Lee | F01D 11/001 415/171.1 |
| 9,068,513 B2 | * | 6/2015 | Lee | F01D 5/082 |
| 9,181,816 B2 | * | 11/2015 | Lee | F01D 11/001 |
| 9,260,979 B2 | * | 2/2016 | Lee | F01D 11/001 |
| 2006/0269398 A1 | * | 11/2006 | Marini | F01D 5/081 415/115 |
| 2014/0205443 A1 | * | 7/2014 | Lee | F01D 11/001 415/170.1 |
| 2014/0234076 A1 | * | 8/2014 | Lee | F01D 11/001 415/116 |

(Continued)

*Primary Examiner* — Craig Kim
*Assistant Examiner* — Eldon Brockman

(57) ABSTRACT

A rim seal arrangement for a gas turbine engine includes a first seal face on a rotor component, and a second seal face on a stationary annular rim centered about a rotation axis of the rotor component. The second seal face is spaced from the first seal face along an axial direction to define a seal gap. The seal gap is located between a radially outer hot gas path and a radially inner rotor cavity. The first seal face has a plurality of circumferentially spaced depressions, each having a depth in an axial direction and extending along a radial extent of the first seal face. The depressions influence flow in the seal gap such that during rotation of the rotor component, fluid in the seal gap is pumped in a radially outward direction to prevent ingestion of a gas path fluid from the hot gas path into the rotor cavity.

16 Claims, 5 Drawing Sheets

(56) References Cited

U.S. PATENT DOCUMENTS

| | | | |
|---|---|---|---|
| 2014/0286760 A1* | 9/2014 | Lee | F01D 5/082 |
| | | | 415/170.1 |
| 2015/0003973 A1* | 1/2015 | Lee | F01D 5/082 |
| | | | 415/173.5 |
| 2015/0071763 A1* | 3/2015 | Lee | F01D 11/001 |
| | | | 415/116 |
| 2016/0215624 A1* | 7/2016 | Chouhan | F01D 5/145 |
| 2016/0215625 A1* | 7/2016 | Chouhan | F01D 5/147 |
| 2016/0215626 A1* | 7/2016 | Chouhan | F01D 11/001 |

* cited by examiner

RIM SEAL ARRANGEMENT HAVING PUMPING FEATURE

STATEMENT REGARDING FEDERALLY SPONSORED DEVELOPMENT

Development for this invention was supported in part by Contract No. DE-FC26-05NT42644, awarded by the United States Department of Energy. Accordingly, the United States Government may have certain rights in this invention.

BACKGROUND

1. Field

The present invention relates to turbine blades, and in particular to a rim seal arrangement for a turbine blade in a gas turbine engine.

2. Description of the Related Art

Gas turbine engine blades used in the engine's turbine section are typically cooled via internal cooling channels through which compressed air is forced. This compressed air is typically drawn from a supply of compressed air created by the engine's compressor. However, drawing of the compressed air for cooling reduces the amount of compressed air available for combustion. This, in turn, lowers engine efficiency. Consequently, minimizing the amount of cooling air withdrawn from the compressor for cooling is an important technology in modern gas turbine design.

In some gas turbine engine models downstream blades extend relatively far in the radial direction. Downstream blades may include, for example, a last row of blades. Cooling channels typically direct cooling air from a base of the blade toward a tip, where it is exhausted into a flow of combustion gases. By virtue of the cooling channel extending within the blade so far radially outward, rotation of the blade, and the cooling channel disposed therein, imparts a centrifugal force on the cooling air that urges the cooling air in the cooling channel radially outward. The cooling air exits the blade and this creates a flow of cooling air within the cooling channel. This flow within the cooling channel creates a suction that draws more cooling air from a rotor cavity around the platform of the blade into the cooling channel. Consequently, unlike convention cooling where compressed air is forced through the cooling channels, air that is not compressed, such as ambient air present outside of the gas turbine engine, can be used to cool the downstream blades.

A static pressure of ambient air is sufficiently greater than a static pressure in the rotor cavity to produce a flow of cooling fluid from a source of ambient air toward the rotor cavity. Thus, a static pressure of ambient air may push a supply of ambient air toward the rotor cavity, where a suction generated by the rotation of the blades then draws the ambient air from the rotor cavity through the cooling channels in the turbine blades, thereby completing an ambient air cooling circuit. The suction force aids in drawing ambient air into the rotor cavity. In this manner a flow of ambient air throughout the cooling circuit can be maintained.

However, the static pressure within the rotor cavity often less than a static pressure of combustion gases in a radially inward region of the hot gas path. The static pressure of the combustion gases in a radially inward region of the hot gas path may vary circumferentially and there may be transient operating conditions that produce static pressure differences in the combustion gases. These and other conditions may lead to ingestion of hot gases through a rim seal separating the rotor cavity from the hot gases in the radially inward region of the hot gas path. Ingestion of hot gases may be detrimental to a life of the engine components.

SUMMARY

Briefly, aspects of the present invention provide a rim seal arrangement for a turbine blade in a gas turbine engine.

According to a first aspect of the invention, a rim seal arrangement for a gas turbine engine is provided. The rim seal arrangement includes a first seal face on a rotor component, and a second seal face on a stationary annular rim centered about a rotation axis of the rotor component. The second seal face faces the first seal face and is spaced from the first seal face along an axial direction to define a seal gap. The seal gap is located between a radially outer hot gas path and a radially inner rotor cavity. The first seal face comprises a plurality of circumferentially spaced depressions thereon. Each depression has a depth in an axial direction and extends along a radial extent of the first seal face between a radially outer end and a radially inner end of the depression. The plurality of depressions are configured to influence flow in the seal gap such that during rotation of the rotor component, fluid in the seal gap is pumped in a radially outward direction to prevent ingestion of a gas path fluid from the hot gas path into the rotor cavity.

According to a second aspect of the invention, a turbine blade is provided that includes an airfoil body with an internal cooling channel extending span-wise in a radial direction, and a blade base located at a radially inner end of the airfoil body for attaching the turbine blade to a rotor disc. The blade base comprises an aft face that faces a seal gap between a radially outer hot gas path and a radially inner rotor cavity in fluid communication with the internal cooling channel. The seal gap is defined by a space between the aft face of the blade base and a fore-end of an annular stationary rim centered about a longitudinal axis of the rotor disc. The aft face of the blade base facing the seal gap comprises a plurality of circumferentially spaced depressions thereon. Each depression has a depth in an axial direction, a width in a circumferential direction and extends along a radial extent of the aft face between a radially outer end and a radially inner end of the depression. The plurality of depressions are configured to influence flow in the seal gap such that during rotation of the turbine blade, fluid in the seal gap is pumped in a radially outward direction to prevent ingestion of a gas path fluid from the hot gas path into the rotor cavity.

According to a third aspect of the invention, a gas turbine engine is provided, that includes a turbine blade comprising a blade base affixed to a rotor disc and an annular stationary rim disposed aft of the turbine blade and centered about a longitudinal axis of the rotor disc. The rim extends fore toward the blade base and comprises a fore-end that is spaced from an aft face of the blade base to define a seal gap between a radially outwardly located hot gas path and a radially inwardly located rotor cavity in fluid communication with an internal cooling channel of the turbine blade. The aft face of the blade base facing the seal gap comprises a plurality of circumferentially spaced depressions thereon. Each depression has a depth in an axial direction and extends along a radial extent of the aft face between a radially outer end and a radially inner end of the depression. The plurality of depressions are configured to influence flow in the seal gap such that during rotation of the turbine blade, fluid in the seal gap is pumped in a radially outward direction to prevent ingestion of a gas path fluid from the hot gas path into the rotor cavity.

BRIEF DESCRIPTION OF THE DRAWINGS

The invention is shown in more detail by help of figures. The figures show preferred configurations and do not limit the scope of the invention.

DETAILED DESCRIPTION

In the following detailed description of the preferred embodiment, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

Embodiments of the present invention relate to a rim seal arrangement that may be used for sealing a rotor cavity from a hot gas path. The hot gas path may lie radially outwardly with respect to the rotor cavity and separated therefrom by a fluid seal gap, defined between a rotor component and a stationary rim. The present inventor has devised a mechanism whereby fluid in the seal gap is urged radially outward by way of cutouts or depressions formed on the rotor component, to prevent ingestion of hot gas from the hot gas path into the rotor cavity. The rim seal arrangement can be used for a turbine blade cooled with compressed air or a turbine blade cooled using an ambient air cooling arrangement. The description herein describes a rim seal arrangement as used in an ambient air cooled arrangement, but the technology can also be applied directly to a compressed air cooled arrangement.

Figure 1:
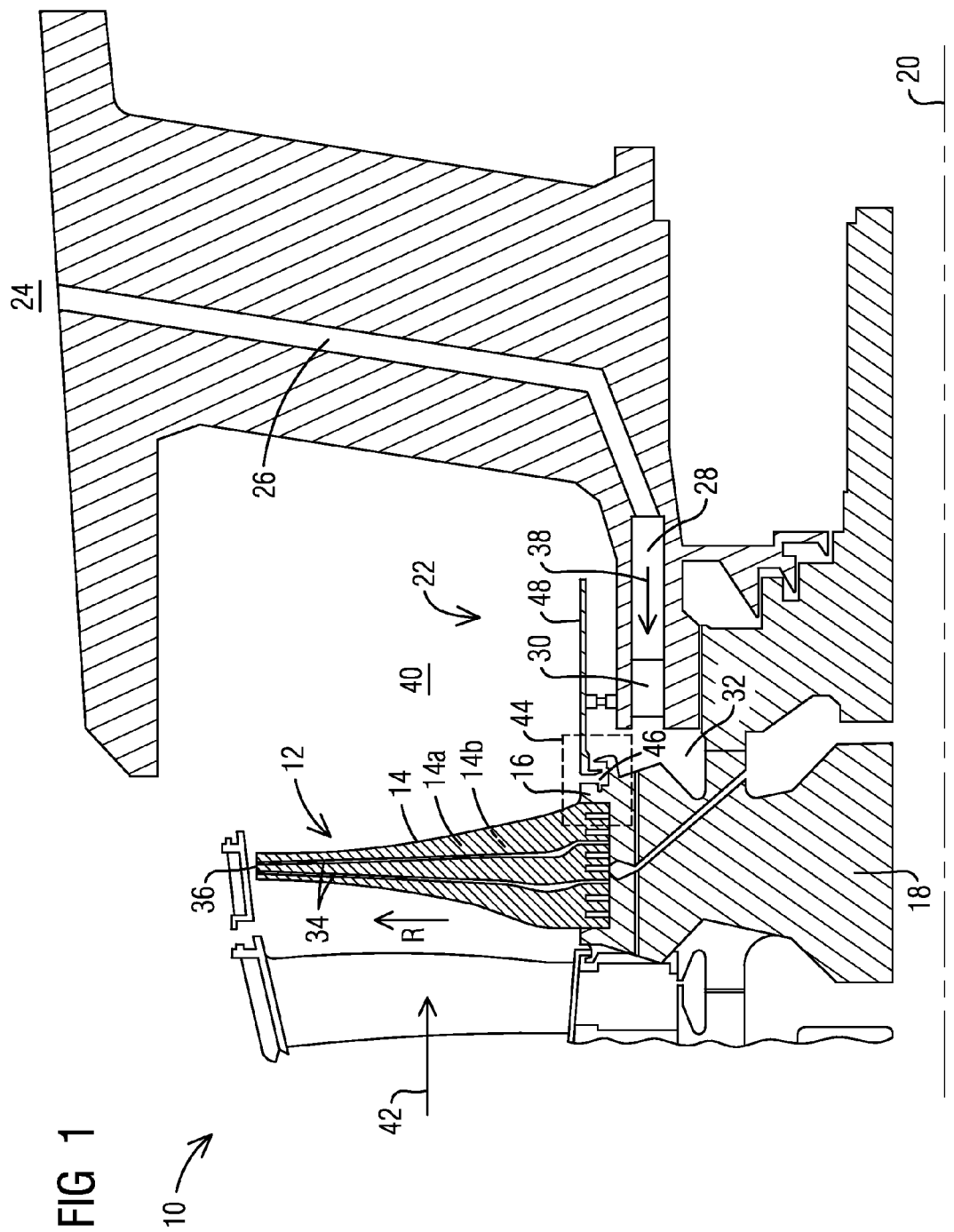
FIG. 1 is a schematic cross section of a side view of a portion of a gas turbine engine.

FIG. 1 shows a schematic cross-section of a side view of a portion of a gas turbine engine 10 comprising a row of ambient air-cooled turbine blades 12. Each blade 12 comprises an airfoil body 14 and a base portion 16 affixed to rotor disc 18 via a blade root (not shown). The rotor disc 18 is rotatable about a longitudinal axis 20. The airfoil body 14 extends span-wise in a radial direction with respect to the longitudinal axis 20 and is made up of a generally concave pressure side 14a and a generally convex suction side 14b. The turbine blades 12 are cooled by an ambient cooling circuit 22. According to the illustrated implementation, the ambient cooling circuit 22 includes a source 24 of ambient air at atmospheric pressure; at least one air supply passage 26 between the source 24 and a pre-swirler plenum 28 and a pre-swirler 30; a rotor cavity 32 located adjacent to and aft of the turbine blades 12; and a blade cooling channel inlet (not shown), a cooling channel 34 internal to the turbine blade 12, and a blade cooling channel outlet 36 in each of the turbine blades 12. Once inside the air supply passage 26, the ambient air becomes cooling fluid 38. The cooling fluid 38 travels through the air supply passage 26 where it enters the pre-swirler plenum 28, which is an annular shaped plenum and which supplies the cooling fluid 38 to the pre-swirler 30. In the pre-swirler 30, the cooling fluid 38 is swirled about the longitudinal axis 20 into a more matched swirl direction in the rotor cavity 32 in relation to the rotation of the turbine blades 12. From the rotor cavity 32, the swirled cooling fluid 38 enters the blade cooling channel inlets and then travels through each cooling channel 34. When in the cooling channels 34, the rotation of the turbine blades 12 creates a centrifugal force in a radially outward direction R, that motivates the cooling fluid 38 through the cooling channels 34. The cooling fluid 38 is ejected from the cooling channel outlet 36 into a hot gas path 40 in which a gas path fluid 42 comprising hot gases flow. The movement of the cooling fluid 38 through the cooling channels 34 and out of the cooling channel outlet 36 creates a suction force that draws cooling fluid 38 from the rotor cavity 32 into the cooling channel 34 to replace the cooling fluid 38 that has been ejected. A static pressure of ambient air pushes cooling fluid 38 toward the rotor cavity 32 to replace cooling fluid 38 that is drawn into the cooling channels 34, thereby completing the ambient air cooling circuit 22.

In the illustrated embodiment, a rim seal arrangement 44 (rim seal) is disposed aft of the base portion 16 of the turbine blade 12, between an outer part 46 of the rotor cavity (outer rotor cavity) and the hot gas path 40. During operation, due to the above-described suction force created by the rotation of the turbine blade 12, a static pressure $P_{32}$ in the rotor cavity 32 and in particular a static pressure $P_{46}$ in the outer rotor cavity 46 may fall below the static pressure $P_{40}$ in the hot gas path 40, which may lead to ingestion of the gas path fluid 42 into the outer rotor cavity 46 and into the rotor cavity 32. Ingestion of hot gases into the rotor cavity may be detrimental to the life of some engine components. Embodiments of the present invention deal with a mechanism to prevent the ingestion of the gas path fluid 42.

Figure 2:
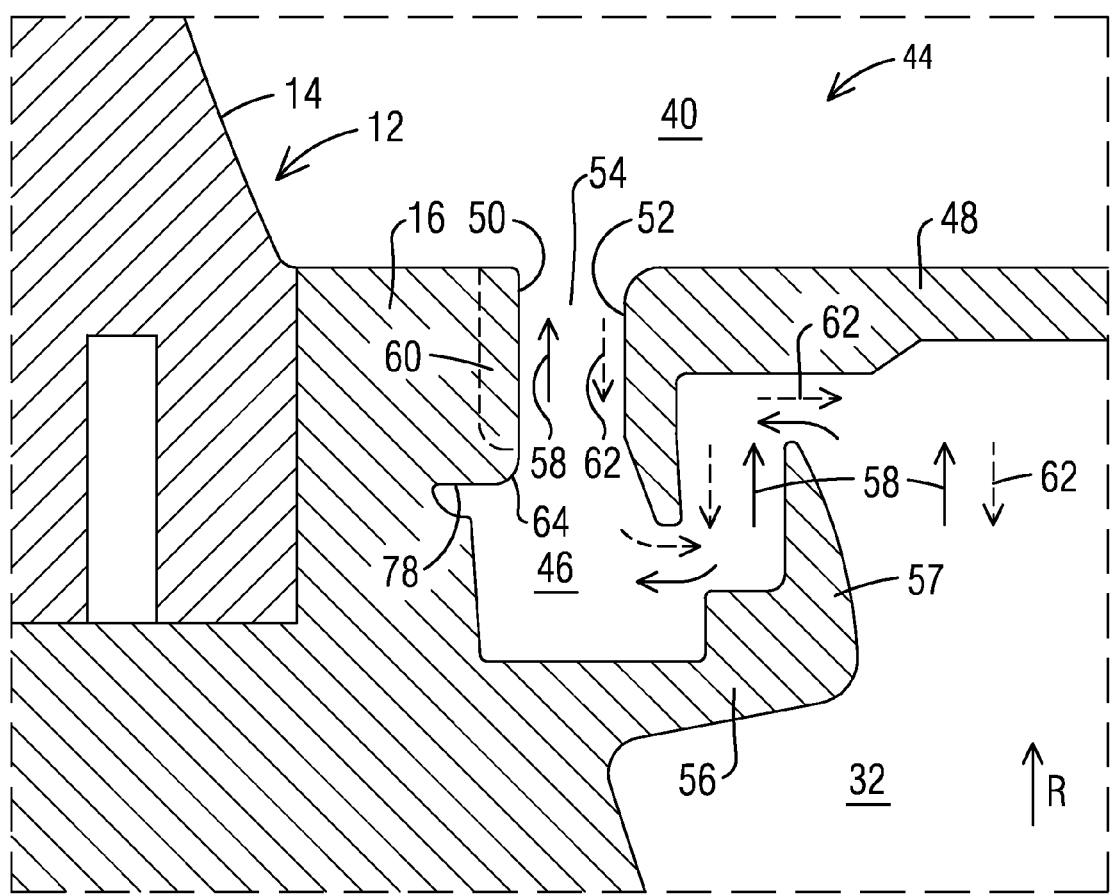
FIG. 2 is a schematic cross-section of a side view of a rim seal arrangement according to an embodiment of the present invention.

As shown in greater detail in FIG. 2, a rim seal 44 according to an illustrated non-limiting embodiment includes an annular and stationary rim 48 centered about the longitudinal axis 20 (see FIG. 1). The annular rim 48 extends longitudinally fore toward the turbine blade 12 and comprises a fore end 52 spaced axially from an aft face 50 of the base portion 16 of the turbine blade 12 to define a seal gap 54. The aft face 50 of the blade base 16 and the fore end 52 of the rim 48 respectively form a rotating first seal face and a stationary second seal face, facing the seal gap 54 in opposed directions. The seal gap 54 adjoins the hot gas path 40 which is located radially outward thereof, and adjoins the outer rotor cavity 46 which is located radially inward thereof. An angel wing 56 may extend aft from a radially inner portion of the blade base 16 such that the second seal face 52 is positioned axially between the first seal face 50 and an aft end 57 of the angel wing 56, to define a tortuous fluid path between the hot has path 40 and the rotor cavity 32. In the shown embodiment, the first seal face 50 of the rim seal 44 is defined on an aft face of a blade platform. In alternate embodiments, the first seal face of the rim seal may be located on any other rotor component. In for example, in one embodiment (not shown), a rim seal may be defined by an aft face of the angel wing and a fore end of a correspondingly positioned stationary annular rim.

When the static pressure $P_{46}$ of the outer rotor cavity 46 and the static pressure $P_{32}$ of the rotor cavity 32 fall below the static pressure $P_{40}$ at the radially inward region of the hot gas path 40, an ingestion of gas path fluid may take place via the seal gap 54 into the outer rotor cavity 46 and then into the rotor cavity 32 as schematically illustrated by the dotted flow lines 62. The present inventor has addressed this issue by modifying the rotating first seal face 50 to include circumferentially arranged depressions or cutouts 60 on the first seal face 50. The depressions 60 are spaced in the circumferential direction (perpendicular to the plane of FIG. 2), each having a depth in the axial direction (parallel to the longitudinal axis 20) and extending along a radial extent of the first seal face 50. The depressions 60 influence flow in the seal gap 54 such that during rotation of turbine blade 12, fluid in the seal gap 54 is pumped in the radially outward direction R, thereby purging the rotor cavity 32 and preventing ingestion of the gas path fluid into the rotor cavity 32. The resulting purge flow is schematically illustrated by flow lines 58.

Figure 3:
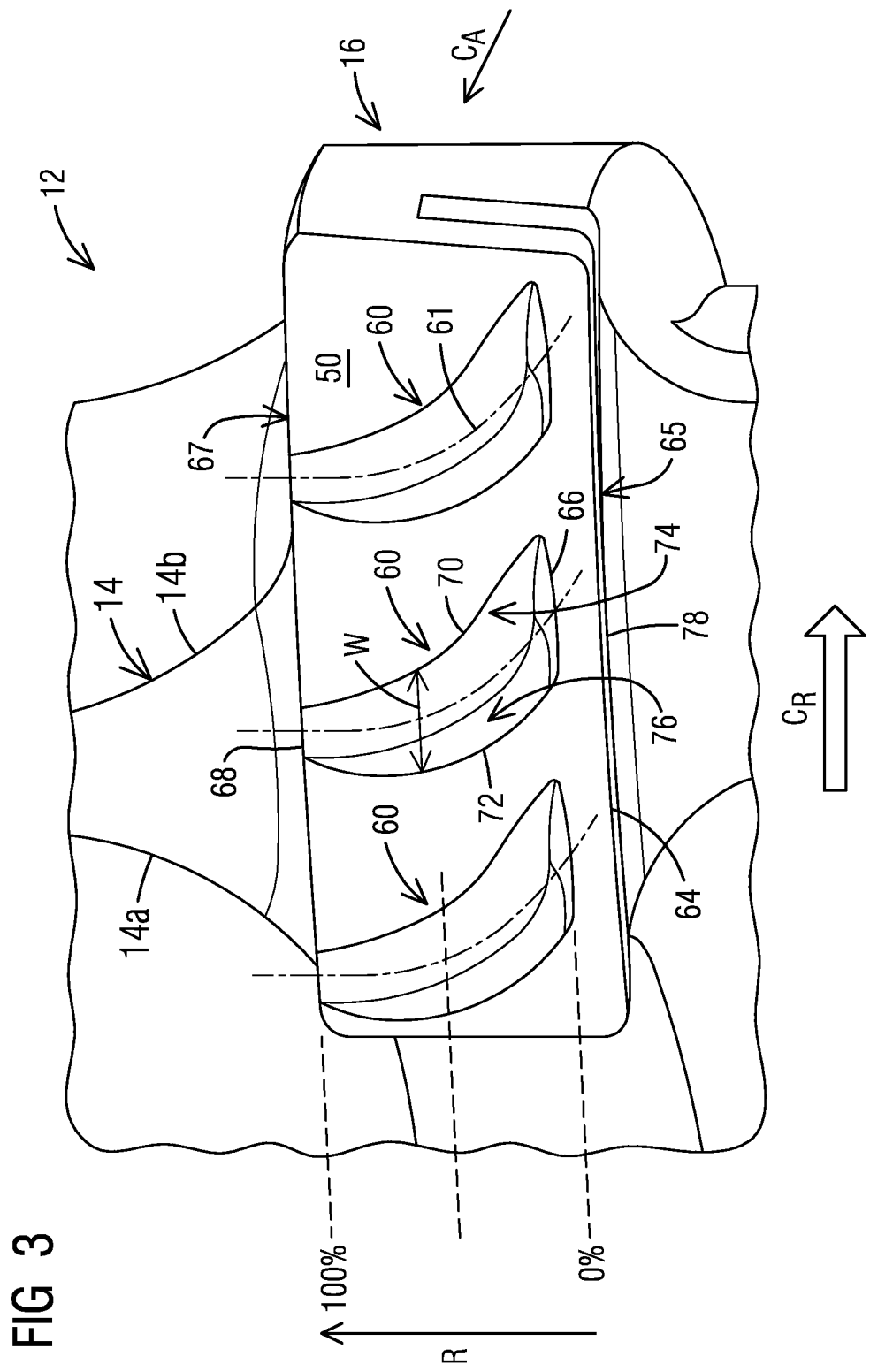
FIG. 3 is an axial view, looking in an aft-to-fore direction, of a seal face of a rotor component having circumferentially spaced depressions in accordance with an embodiment of the present invention.
Figure 4A:
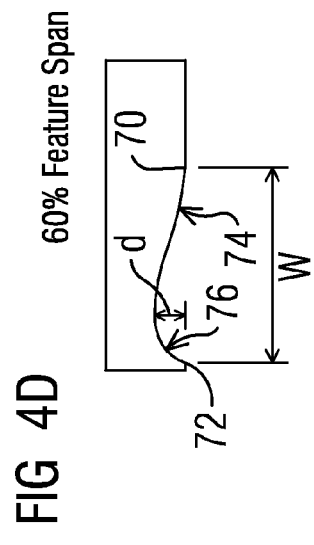
FIGS. 4A-F are schematic cross-sectional views, looking radially inward, of the seal face of the rotor component, showing a circumferential contour of a depression at varying radial positions according an embodiment of the present invention.
Figure 4B:
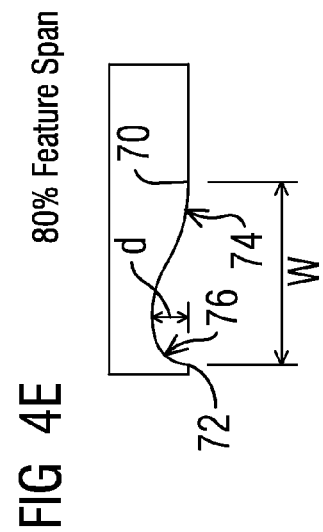
Figure 4C:
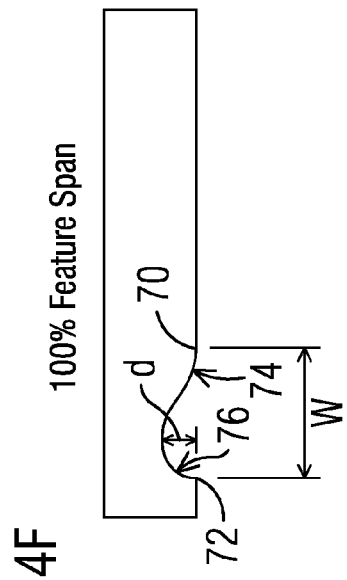
Figure 4D:
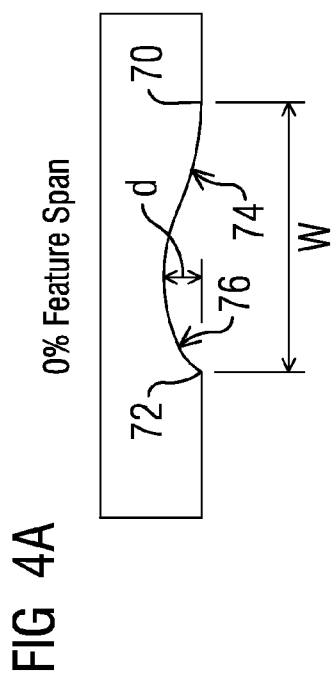
Figure 4E:
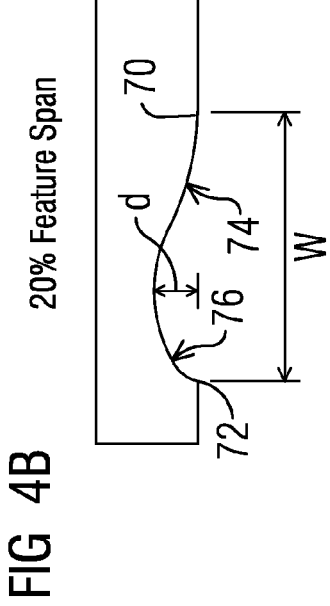
Figure 4F:
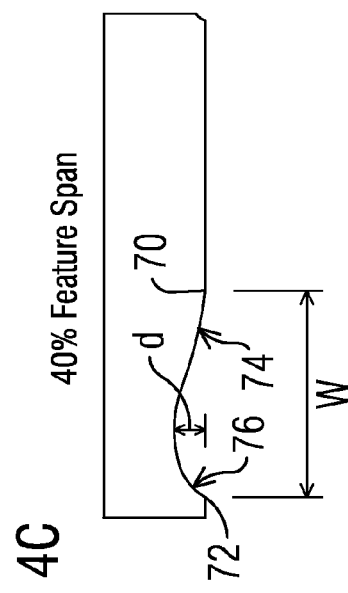

Referring to FIG. 3, each depression 60 on the seal face 50 extends in the radial direction from a radially inner end 66 to a radially outer end 68 of the depression 60 and has a width W in the circumferential direction defined between a leading end 70 and a trailing end 72 of the depression 60. The leading and trailing ends 70 and 72 extend from the radially inner end 66 to the radially outer end 68. The surface of the depression 60 includes a leading surface 74 adjacent to the leading end 70 and a trailing surface 76 adjacent to the trailing end 72.

FIGS. 4A-F illustrate sectional views of a depression 60 looking radially inward at different radii between and including the radially inner end 66 (0% feature span) and the radially outer end 68 (100% feature span) of the depression 60 (see FIG. 3). As shown therein, the surface of each depression 60 may be contoured in the circumferential or width direction such that the leading surface 74 is generally convex and the trailing surface 76 is generally concave. The leading and trailing surfaces 74 and 76 are defined with respect to the relative direction $C_A$ of fluid flow in the seal gap 54 caused by the rotation of the turbine blade 12 (as indicated by the directional arrow $C_R$), with the leading surface 74 being located upstream of the trailing surface 76 with respect to said relative flow direction $C_A$. In this example, as shown in FIG. 3 each depression 60 is contoured to form a concave trailing surface 76 following a convex leading surface 74 in a circumferential direction from the suction side 14b to the pressure side 14a of the turbine blade 12. Ambient air flowing across the depression 60 is scooped by the convex leading surface 74. The concave trailing edge 76 discourages the scooped ambient air from leaving the depression 60 tangentially and instead urges the scooped ambient air in the depression 60 to move radially and outwardly toward an outer edge 67 of the seal face 50. Furthermore, each depression 60 may have a converging cross-sectional area from the radially inner end 66 to the radially outer end 68 to accelerate the ambient air toward the outer edge 67 of the seal face 50. In one embodiment, as shown in FIGS. 3 and 4A-F, the width W may converge from the radially inner end 66 to the radially outer end 68 of the depression 60. Furthermore, as shown in FIGS. 4A-F, the maximal axial depth d of each depression may also vary along the radial direction, such that the overall cross-sectional area defined by the circumferential width and the axial depth decreases from the radially inner end 66 to the radially outer end 68.

Referring back to FIG. 3, a flow axis 61 of the depression 60, for example as defined by a centerline extending centrally between the leading end 70 and the trailing end 72, may be geometrically configured for effective pumping of the purge flow. In one embodiment, the flow axis 61 may be configured such that the radially inner end 66 is circumferentially offset from the radially outer end 68 in the direction of rotation $C_R$ of the turbine blade 12. This ensures that the radially inner end 66 is positioned circumferentially upstream of the radially outer end 68 with respect to the ambient air flow from the outer rotor cavity 46. In the illustrated embodiment, the flow axis 61 is curved in the direction of rotation $C_R$ from the radially outer end 68 to the radially inner end 66. In particular, as shown, the flow axis 61 may be angled with respect to the radial direction R toward the direction of rotation $C_R$ of the turbine blade at the radially inner end 66. The angular orientation of the flow axis 61 at the radially inner end 66 allows a greater mass of ambient air to be scooped into the depression 60 from the outer rotor cavity 46. Furthermore, as shown, the flow axis 61 may be parallel to the radial direction R at the radially outer end 68, to discharge the ambient air in a radially outward direction into the hot gas path 40.

In the illustrated embodiment, the radially outer end 68 is located at a radially outer edge 67 of the seal face 50, while the radially inner end 60 terminates short of a radially inner edge 65 of the seal face 50. To improve the effectiveness of purging, in some embodiments, the radial extent of the depression 60 between the radially inner and outer ends 66 and 68 may cover a substantial radial extent (at least 50%, for example, between 70-90%) of the seal face 50. In one embodiment, as shown in FIGS. 2 and 3 a fillet 64 may be disposed at the radially inner edge 65 of the seal face 50, being positioned radially inward with respect to the radially inner end 66 of the depression 60. In this example, the fillet 64 provides a predetermined radius at a corner of the aft face 50 and a radially inward facing surface 78 of the blade platform.

Figure 5:
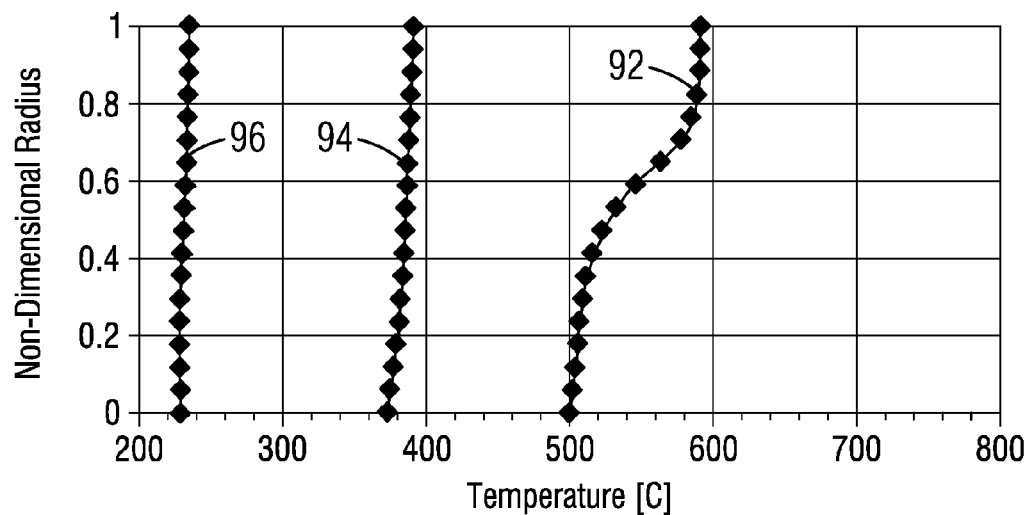
FIG. 5 is a schematic graph showing a variation of temperature along the radial direction in a rim seal arrangement according to embodiments of the present invention.
Figure 6:
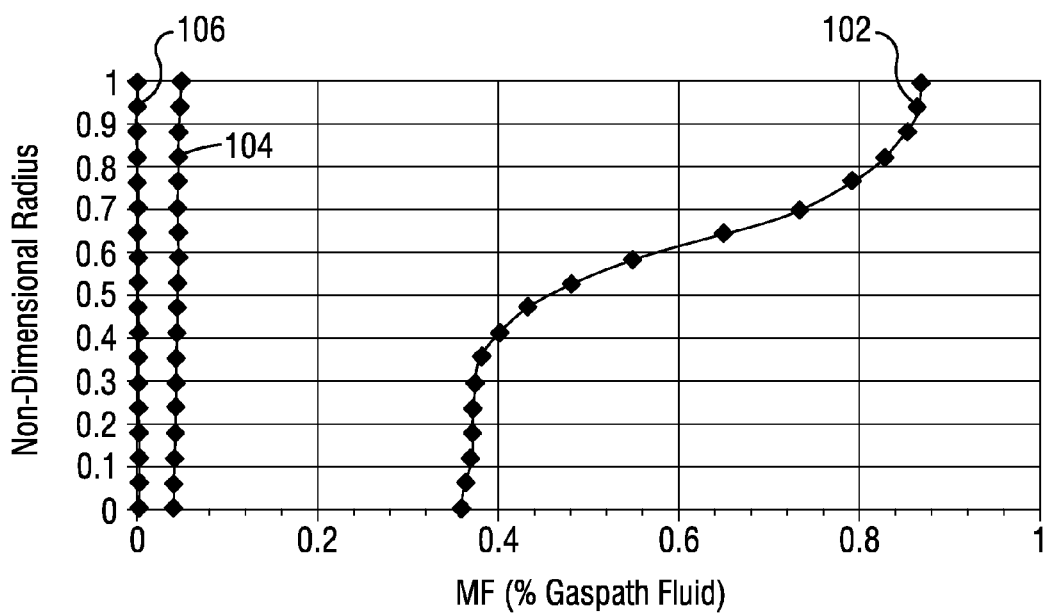
FIG. 6 is a schematic graph showing a variation of mass fraction of gas path fluid along the radial direction in a rim seal arrangement according to embodiments of the present invention.

It has been found that the provision of a fillet 64 at the radially inner edge 65 of the seal face 50 significantly enhances the purging effect provided by the circumferentially spaced depression 60 on the seal face 50. FIG. 5 illustrates a variation of temperature along a non-dimensional radius from the radially inner edge 65 (non-dimensional radius=0) to the radially outer edge 67 (non-dimensional radius=1) of the seal face 50. Therein, the curve 92 pertains to a baseline design having a smooth surface (no depressions) at the aft face of the blade platform; the curve 94 pertains to an embodiment with a platform aft face having pumping cutouts according to the illustrated embodiment but without a fillet; and the curve 96 pertains to an embodiment with a platform aft face having said pumping cutouts in combination with a filleted radially inner edge. As shown, the temperature of the rim seal may be lowered by 100° C. or more by providing pumping cutouts at the aft face of the platform and further lowered by an additional 100° C. or more by providing a fillet at the platform corner. FIG. 6 illustrates a variation of mass fraction MF of gas path fluid along a non-dimensional radius from the radially inner edge 65 (non-dimensional radius=0) to the radially outer edge 67 (non-dimensional radius=1) of the seal face 50. Therein, the curve 102 pertains to a baseline design having a smooth surface (no depressions) at the aft face of the blade platform; the curve 104 pertains to an embodiment with a platform aft face having pumping cutouts according to the illustrated embodiment but without a fillet; and the curve 106 pertains to an embodiment with a platform aft face having said pumping cutouts in combination with a filleted radially inner edge. As shown, the pumping cutouts at the platform aft face significantly reduce the mass fraction of gas path fluid in the rim seal as opposed to a smooth platform aft face. The reduction of mass fraction of gas path fluid is evidently even more pronounced by providing a fillet at the platform corner. The significant additional decrease in the mass fraction of gas path fluid, and consequently temperature, in the rim seal, due to the addition of an inner fillet, may be attributed to a reduction in vortex formation at the filleted radially inner edge 65, which would allow a greater mass of ambient air to be scooped by the cutouts and pumped radially outwardly.

In an alternate implementation, instead of an ambient air cooled arrangement, the above illustrated embodiments of the rim seal may be used for a compressed air cooled arrangement in a gas turbine engine. Use of the above-described rim seal in a compressed air cooled arrangement would lead to a reduction in the amount of air diverted from the compressor for purging the rotor cavity, thereby increasing engine efficiency.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. A rim seal arrangement for a gas turbine engine, comprising:
   a first seal face on a rotor component,
   a second seal face on a stationary annular rim centered about a rotation axis of the rotor component, the second seal face facing the first seal face and being spaced from the first seal face along an axial direction to define a seal gap, wherein the seal gap is located between a radially outer hot gas path and a radially inner rotor cavity,
   wherein the first seal face comprises a plurality of circumferentially spaced depressions thereon, each depression having a depth in an axial direction and extending along a radial extent of the first seal face between a radially outer end and a radially inner end of the depression,
   the plurality of depressions being configured to influence flow in the seal gap such that during rotation of the rotor component, fluid in the seal gap is pumped in a radially outward direction to prevent ingestion of a gas path fluid from the hot gas path into the rotor cavity, and
   wherein each depression has a surface that transitions from a generally convex leading surface to a generally concave trailing surface along a circumferential direction.

2. The rim seal arrangement according to claim 1, further comprising a fillet disposed at a radially inner edge of the first seal face and positioned radially inward with respect to the radially inner end of the depression.

3. The rim seal arrangement according to claim 1, wherein each depression has a converging cross-sectional area from the radially inner end to the radially outer end.

4. The rim seal arrangement according to claim 3, wherein each depression has a decreasing circumferential width from the radially inner end to the radially outer end.

5. The rim seal arrangement according to claim 3, wherein each depression has a maximum axial depth that varies between the radially inner end and the radially outer end.

6. The rim seal arrangement according to claim 1, wherein each depression comprises a flow axis that is geometrically configured such that the radially inner end is circumferentially offset from the radially outer end in the direction of rotation of the rotor component.

7. The rim seal arrangement according to claim 6, wherein the flow axis is parallel to the radial direction at the radially outer end, and is angled with respect to the radial direction toward the direction of rotation of the rotor component at the radially inner end.

8. The rim seal arrangement according to claim 1, wherein the first seal face is an aft face of a base portion of a turbine blade.

9. A turbine blade comprising:
   an airfoil body extending span-wise in a radial direction and comprising an internal cooling channel, and
   a blade base located at a radially inner end of the airfoil body for attaching the turbine blade to a rotor disc, the blade base comprising an aft face that faces a seal gap between a radially outer hot gas path and a radially inner rotor cavity in fluid communication with the internal cooling channel, the seal gap being defined by a space between the aft face of the blade base and a fore-end of an annular stationary rim centered about a longitudinal axis of the rotor disc,
   wherein the aft face of the blade base facing the seal gap comprises a plurality of circumferentially spaced depressions thereon, each depression having a depth in an axial direction, a width in a circumferential direction and extending along a radial extent of the aft face between a radially outer end and a radially inner end of the depression,
   the plurality of depressions being configured to influence flow in the seal gap such that during rotation of the turbine blade, fluid in the seal gap is pumped in a radially outward direction to prevent ingestion of a gas path fluid from the hot gas path into the rotor cavity, and
   wherein each depression has a surface that transitions from a generally convex leading surface to a generally concave trailing surface along a circumferential direction.

10. The turbine blade according to claim 9, further comprising a fillet disposed at a radially inner edge of the aft face of the blade base and positioned radially inward with respect to the radially inner end of the depression.

11. The turbine blade according to claim 9, wherein each depression has converging cross-sectional area from the radially inner end to the radially outer end, the cross-sectional area being defined by the width and the depth of the depression.

12. The turbine blade according to claim 9, wherein the radially inner end is circumferentially spaced from the radially outer end in the direction of rotation of the turbine blade.

13. The turbine blade according to claim 12, wherein each depression comprises circumferentially spaced leading and trailing ends that extend from the radially outer end to the radially inner end, a depression centerline being defined extending centrally between the leading end and the trailing end, wherein the depression centerline is parallel to the radial direction at the radially outer end, and the depression centerline is angled with respect to the radial direction toward the direction of rotation of the turbine blade at the radially inner end.

14. A gas turbine engine comprising:

a turbine blade comprising a blade base affixed to a rotor disc, and an annular stationary rim disposed aft of the turbine blade and centered about a longitudinal axis of the rotor disc, wherein the rim extends fore toward the blade base and comprises a fore-end that is spaced from an aft face of the blade base to define a seal gap between a radially outwardly located hot gas path and a radially inwardly located rotor cavity in fluid communication with an internal cooling channel of the turbine blade, wherein the aft face of the blade base facing the seal gap comprises a plurality of circumferentially spaced depressions thereon, each depression having a depth in an axial direction and extending along a radial extent of the aft face between a radially outer end and a radially inner end of the depression, the plurality of depressions being configured to influence flow in the seal gap such that during rotation of the turbine blade, fluid in the seal gap is pumped in a radially outward direction to prevent ingestion of a gas path fluid from the hot gas path into the rotor cavity, wherein each depression has a surface that transitions from a generally convex leading surface to a generally concave trailing surface along a circumferential direction.

15. The gas turbine engine according to claim 14, further comprising a cooling fluid supply passage providing fluid communication between the rotor cavity and a source of cooling fluid at atmospheric pressure, wherein the rotation of the turbine blade is effective to draw the cooling fluid from the source into the rotor cavity via the cooling fluid supply passage.

16. The gas turbine engine according to claim 15, further comprising a pre-swirler disposed downstream of the turbine blade between the rotor cavity and the cooling fluid supply passage.

* * * * *